July 21, 1942.  J. SHAIN  2,290,388
DEMOUNTABLE WHEEL
Filed Oct. 9, 1941

Joseph Shain
INVENTOR
BY Victor J. Evans & Co.
ATTORNEYS

Patented July 21, 1942

2,290,388

UNITED STATES PATENT OFFICE 2,290,388

DEMOUNTABLE WHEEL

Joseph Shain, Philadelphia, Pa.

Application October 9, 1941, Serial No. 414,347

3 Claims. (Cl. 301—9)

The present invention relates to new and useful improvements in demountable wheel construction for motor vehicles.

With the wheels commonly employed on automobiles and like vehicles today inconvenience and some difficulty is encountered in mounting the removable section of a wheel on the complementary section held on the axle in that it is necessary to manipulate the demountable section in order to align the openings therein with the fastening elements such as the studs or bolts on the section retained on the axle.

An object of the present invention is to provide a demountable wheel constructed so that the openings in the demountable wheel section will be automatically aligned with the connecting projections on the axle carried section when the demountable section has been placed in assembly position.

Another object of the invention is the provision of a demountable wheel designed so that the removable section is formed with a central non-circular opening which slidably engages a correspondingly shaped projection on the axle held wheel section so as to accurately align the apertures in the removable section with the studs or bolts of the complementary section.

A further object of the invention is to provide a demountable wheel of the aforesaid character which is relatively simple and inexpensive in construction and which is highly efficient for the purpose intended.

Other objects and advantages of the invention will become apparent as the description progresses.

Figure 1:
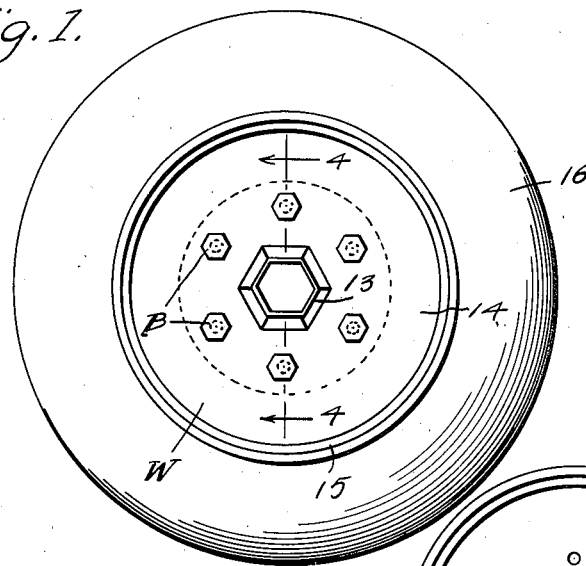
Figure 2:
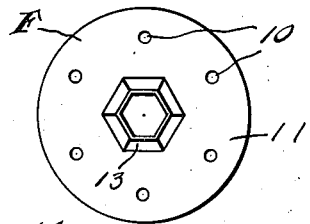
Figure 3:
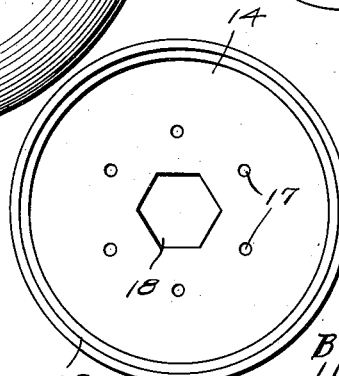
Figure 5:
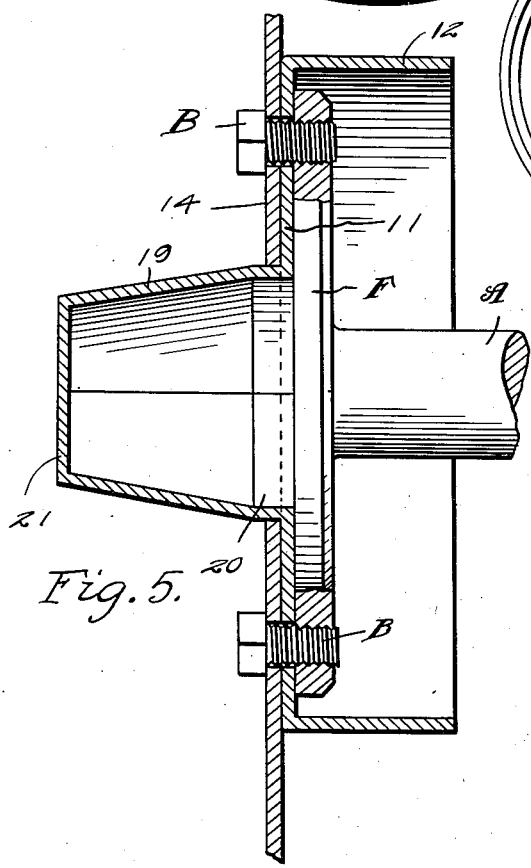
Figure 4:
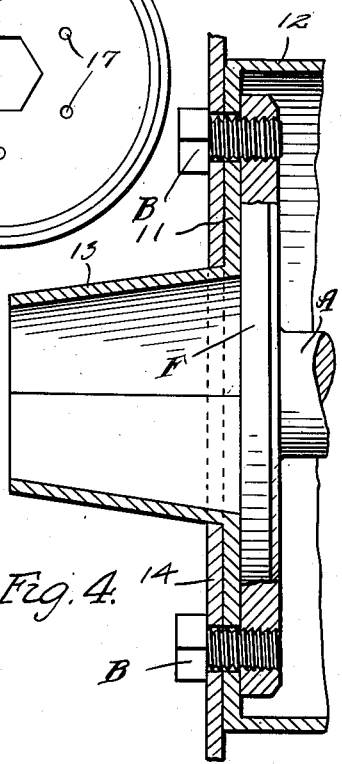

In the accompanying drawing, wherein for the purpose of illustration is showed a preferred embodiment of the invention:

Figure 1 is an exterior side elevational view showing a preferred form of the wheel in assembly, Figure 2 is an exterior side elevational view of the brake drum, Figure 3 is a side elevational view of the removable section of the wheel with the tire removed, Figure 4 is an enlarged fragmentary transverse section taken on line 4—4 of Figure 1, and Figure 5 is a similar view illustrating a modified form of the invention.

Referring to Figures 1 to 4 of the drawing, wherein like character of reference designate corresponding parts throughout, A designates the rear axle of an automobile having formed, on the end thereof, a concentric circular flange or disc F, as is known in the art. At circumferentially spaced intervals in the marginal portion of the flange F are provided a plurality of, in the present example six, interiorly threaded apertures 10, concentric with the axis of the axle A designed to receive therein bolts B, and in some instances studs.

To the outer face of the axle flange F is fastened the circular end plate 11 of a brake drum formed with a circumferential flange 12 directed inward with reference to the flange. In my construction the drum plate 11 is formed to provide a hollow outwardly directed projection 13 of non-circular exterior configuration and arranged axially with respect to the axle A. As shown in drawing and particularly at Figure 4, this projection is in the form of a tubular extension directed outwardly of the flange F and having a hexagonal cross-sectional contour shaped to provide a diminishing taper toward its outer end, so as to present a pyramidal axial projection.

Thus, the flange F together with the brake drum and tapered projection 13 thereof constitutes the axle held section of the wheel. To this section is connected a removable or demountable wheel section W embodying a body portion 14 or disc shape or other preferred construction equipped with a peripheral rim 15 designed to engage a tire 16. This wheel body 14 is provided with a plurality of circularly arranged apertures 17 concentric with its center designed to assume positions in alignment with the aperture 10 in the axle flange F for the reception of the bolts B therethrough. A feature of my invention is to form the wheel body 14 with a central opening 18 shaped in correspondence with the exterior contour of the projection 13 and designed to fit quite closely about the inner or base portion of the projection 13 when the body is in assembly arrangement on the axle held section of the wheel, as best shown at Figure 4. As will be noted the alignment positioning projection 13 is tapered throughout its length and is open at both ends.

In a modified construction of the wheel, shown in Figure 5, the positioning projection, indicated at 19, formed on the end wall of the brake drum and forming part of the axle mounted wheel section is tapered through the major portion of its length but the inner portion is non-tapered to provide a relatively short base portion 20 of straight formation about which the apertured wheel body 14 is fitted in its fully assembled position. Also, the outer end of the polygonal and pyramidal projection 19 is closed by a solid end wall 21.

While the sectional assembly Figures 4 and 5 illustrate the rear or drive wheel structure of the invention it will be readily apparent that the construction is similarly applicable to the front or steering wheels, the removable wheel section 14 being ordinarily identical for the front and rear while the positioning projection 13 is formed at the inner edge of the brake drum of a front wheel assembly and extends concentrically with the front wheel hub, with both ends open.

In use, the demountable wheel section is associated with the wheel carried complementary section by axially sliding the central apertured portion of the wheel body 14 over the tapered polygonal aligning projection which, although shown as of hexagonal configuration may obviously be of other non-circular or polygonal configuration. When the sections are thus assembled, the holes for receiving the bolts B or, in some cases studs, will automatically assume accurately aligned positions and greatly facilitate the assembly of the wheel sections and the connection thereof.

It is to be understood that the form of the invention herein shown and described is to be taken as a preferred and a modified example of the same and that various changes as to the shape, size and arrangement of parts may be resorted to without departing from the spirit of the invention or the scope of the subjoined claims.

Having thus described my invention, I claim:

1. A wheel of the character described comprising a wheel section mounted on an axle, the said wheel section including a brake drum formed with an outwardly projecting tubular extension, the said extension having an inner base portion of non-tapering configuration and an outer portion having a diminishing taper towards the outer end and closed by an end wall at the outer end thereof, the said extension being of non-circular exterior configuration, and a demountable wheel section detachably connected with the axle mounted wheel section by a plurality of fastening connections disposed concentrically relative to the axle and having a non-circular aperture conforming to and fitted about the non-tapered base portion of the said extension.

2. A vehicle wheel structure comprising an axle having a transversely disposed disk on the end thereof, the said disk having a plurality of bolt engaging apertures disposed concentrically with relation to the axis of the axle, a flanged brake drum having its circular end plate fitted against the exterior of the axle disk and provided with apertures registering with the apertures in the said axle disk, a tubular projection formed on and extending outwardly of the end plate of the drum, the said projection being disposed axially of the axle and having a pyramidal exterior contour having a diminishing taper toward its outer end, and a demountable wheel section detachably secured against the end plate of the drum having bolt receiving apertures registering with the apertures in the drum and axle disk, the said demountable section having a central aperture conforming to the circumferential contour of and fitted about the inner portion of the said tubular projection.

3. In a wheel of the character described, a wheel section mounted on an end of an axle and including a brake drum, a tubular projection formed on and extending outwardly of the said brake drum having an inner base portion of non-tapering configuration and an outer portion having a diminishing taper toward the outer end thereof, the said projection being of non-circular exterior configuration, and a demountable wheel section detachably connected with the axle mounted wheel section having a non-circular central aperture conforming to the contour of and adapted to fit closely about the inner non-tapered portion of the tubular projection.

JOSEPH SHAIN.